United States Patent
Kim

(10) Patent No.: US 10,428,770 B2
(45) Date of Patent: Oct. 1, 2019

(54) SOLENOID VALVE AND METHOD OF CONTROLLING THE SAME

(71) Applicant: HYUNDAI MOTOR COMPANY, Seoul (KR)

(72) Inventor: Hyun Kim, Hwaseong-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 183 days.

(21) Appl. No.: 14/933,500

(22) Filed: Nov. 5, 2015

(65) Prior Publication Data
US 2016/0298785 A1   Oct. 13, 2016

(30) Foreign Application Priority Data

Apr. 8, 2015   (KR) .................. 10-2015-0049867

(51) Int. Cl.
*F16K 31/06* (2006.01)
*F02M 25/08* (2006.01)
*F16K 11/04* (2006.01)
*F16K 11/044* (2006.01)

(52) U.S. Cl.
CPC ......... *F02M 25/0836* (2013.01); *F16K 11/04* (2013.01); *F16K 11/044* (2013.01); *F16K 31/0606* (2013.01); *F16K 31/0627* (2013.01); *F16K 31/0658* (2013.01)

(58) Field of Classification Search
CPC ............. F16K 31/0627; F16K 31/0634; F16K 31/0606
USPC .......................................................... 137/883
See application file for complete search history.

(56) References Cited

U.S. PATENT DOCUMENTS

| | | | |
|---|---|---|---|
| 6,158,713 A * | 12/2000 | Ohya | F16K 31/0679 137/870 |
| 7,185,639 B1 * | 3/2007 | Roche | F02M 25/0836 123/198 DB |
| 8,109,741 B2 * | 2/2012 | Huang | F04D 13/16 137/554 |

FOREIGN PATENT DOCUMENTS

| | | |
|---|---|---|
| JP | 2009-199432 | 9/2009 |
| KR | 20-1997-0030609 | 7/1997 |
| KR | 10-2004-0100034 A | 12/2004 |
| KR | 10-2005-0001716 | 1/2005 |
| KR | 10-2005-0093416 A | 9/2005 |
| KR | 10-2008-0015246 | 2/2008 |
| KR | 10-2008-0048770 | 6/2008 |
| KR | 10-2009-0109930 | 10/2009 |
| WO | WO 9949251 A1 * | 9/1999 |

* cited by examiner

*Primary Examiner* — Marina A Tietjen
*Assistant Examiner* — Paul J Gray
(74) *Attorney, Agent, or Firm* — Brinks Gilson & Lione

(57) ABSTRACT

The present disclosure provides a solenoid valve including: a valve body having an inlet through which a fluid is introduced, and a plurality of outlets through which the introduced fluid is discharged, and a variable switching device for discharging the fluid introduced from the inlet through a selected one of the outlets by a control unit.

6 Claims, 6 Drawing Sheets

Fig. 2 "PRIOR ART"

to a structure of a solenoid valve; and, particularly, to a Purge Control Solenoid Valve (PCSV).

SOLENOID VALVE AND METHOD OF CONTROLLING THE SAME

CROSS-REFERENCE TO RELATED APPLICATION

The present application claims the benefit of Korean Patent Application No. 10-2015-0049867, filed on Apr. 8, 2015, which is incorporated herein by reference in its entirety.

FIELD

Exemplary embodiments of the present disclosure relate to a structure of a solenoid valve; and, particularly, to a Purge Control Solenoid Valve (PCSV).

BACKGROUND

The statements in this section merely provide background information related to the present disclosure and may not constitute prior art.

In a typical internal combustion engine operated using fuel, the fuel in a fuel tank is evaporated and collected in a canister. Subsequently, when the engine reaches a certain condition during the operation thereof, the fuel evaporation gas collected in the canister is transmitted to a surge tank due to a difference in pressure between the fuel tank and an intake manifold, and is then purged.

However, in a GDI (Gasoline Direct Injection) engine equipped with a turbocharger, since the pressure in an intake manifold is very high under the condition of turbo boosting, fuel evaporation gas collected in a canister is not purged. Accordingly, in order to cope with fuel odors and evaporation gas regulations, a separate method is required for the turbo-GDI engine.

FIG. 1 is a diagram illustrating a conventional dual purge system for a vehicle. As illustrated in FIG. 1, the dual purge system additionally includes a purge line in which a solenoid valve 50 is provided on an air suction line at the rear end of an air cleaner 40, in addition to an intake manifold 20, so as to purge fuel evaporation gas.

FIG. 2 is a view illustrating a conventional solenoid valve 50. An armature 55 and an elastic member 54 are operated along with the operation of a solenoid 53 when an engine 10 is in a purge condition, and thus an outlet 52 is opened. Thereby, a fluid (fuel evaporation gas) introduced from a lower inlet 51 of a valve body 56 is discharged to an intake manifold 20 through the opened outlet 52.

However, in the above case, check valves 60a and 60b, i.e. two check valves 60a and 60b are applied to respective purge lines for preventing the fluid from flowing backward, and the fuel evaporation gas evaporated from a fuel tank 70 is purged. For this reason, the system has a complex structure, there is a possibility of backflow, odors are generated, and a purge may not be normally performed.

SUMMARY

The present disclosure provides a solenoid valve including: a valve body having one inlet through which a fluid is introduced, and a plurality of outlets through which the introduced fluid is discharged, the inlet and the outlets extending from the valve body, and a variable switching means for discharging the fluid introduced from the inlet through a selected one of the outlets by a control unit.

The variable switching means may be an armature operated by a solenoid to open or close each of the outlets.

The armature may be arranged at a position corresponding to each of the outlets.

An elastic member, for elastically supporting operation of the armatures when the armatures are opened and closed, may be provided between one armature and the other armature.

Support members, for supporting the armatures when the armatures are opened and closed, may be provided between one armature and the other armature.

A shock absorbing member may be provided between the valve body and the armature.

The outlets may be formed at respective upper and lower sides of the valve body, the armature may be located inside the valve body in each of the outlets, and the armature may be operated upward or downward by the operation of the solenoid so as to open and close the associated outlet.

The inlet may be formed with a guide portion extending into the valve body, and the solenoid may be divided by and located in the guide portion.

One of the outlets may be connected to an intake manifold of an engine, and the other may be connected to a rear end of an air cleaner.

In accordance with another embodiment of the present disclosure, a method of controlling a solenoid valve includes a step of comparing a reference value previously input to a control unit with a measured pressure value of an intake manifold and a step of opening outlets by operating armatures, corresponding to the respective outlets, according to result values derived from the step of comparing.

In the step of comparing, a result value may be derived for the operation of the armature in the outlet connected to the intake manifold, when the pressure in the intake manifold is less than the reference value.

In the step of opening, the armature in the outlet connected to the intake manifold may be operated according to the result value derived from the step of comparing, so as to open the outlet, thereby controlling a fluid in a canister such that the fluid is discharged to the intake manifold.

In the step of comparing, a result value may be derived for the operation of the armature in the outlet connected to a rear end of an air cleaner, when the pressure in the intake manifold is greater than the reference value.

In the step of opening, the armature in the outlet connected to the rear end of the air cleaner may be operated according to the result value derived from the step of comparing, so as to open the outlet, thereby controlling a fluid in a canister such that the fluid is discharged to the rear end of the air cleaner.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
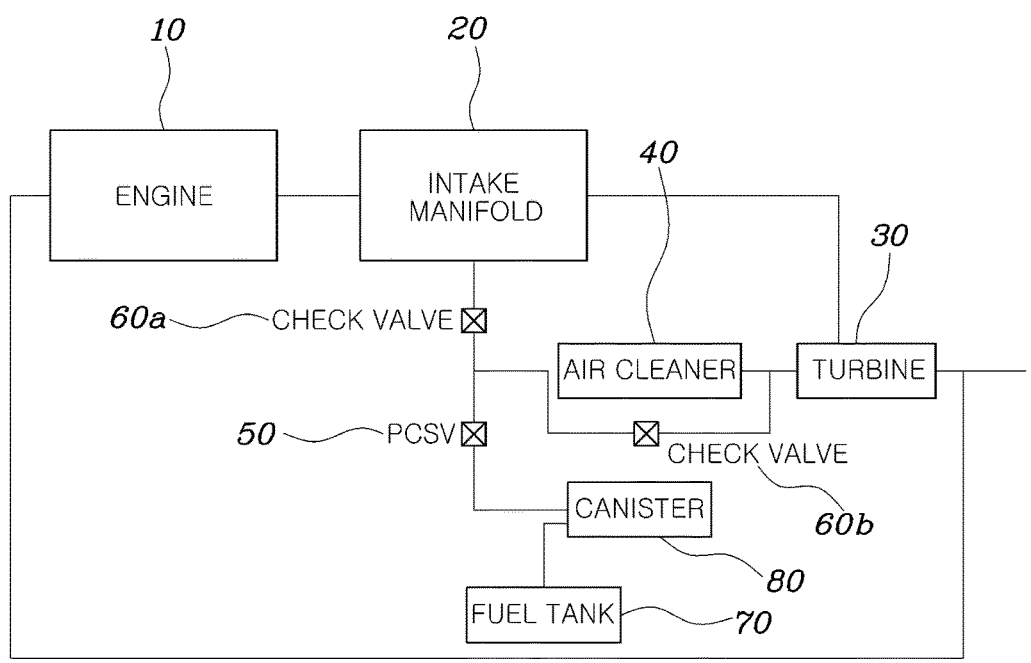
FIG. 1 is a diagram illustrating a conventional dual purge system for a vehicle.
Figure 2:
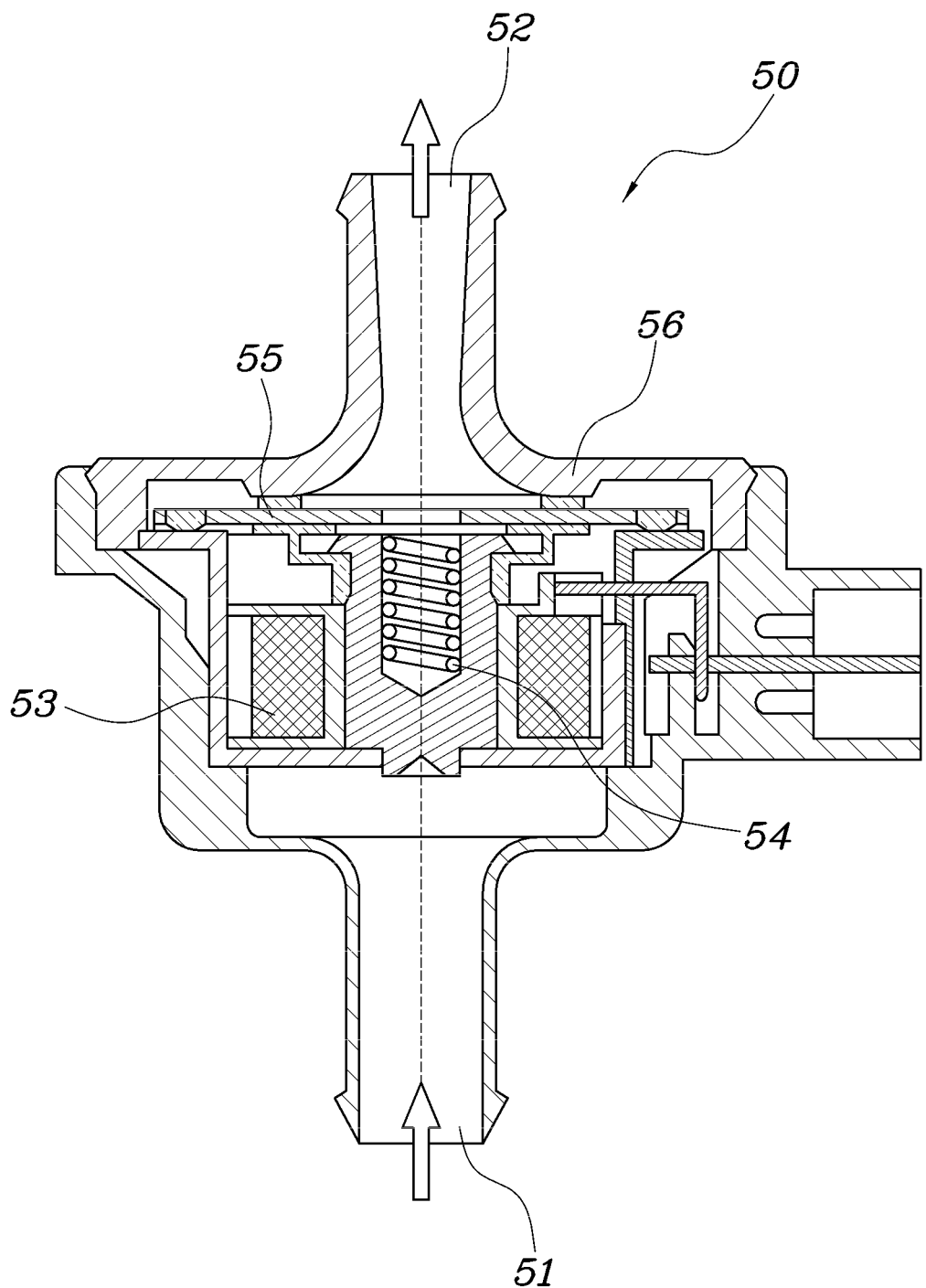
FIG. 2 is a view illustrating a conventional solenoid valve.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Figure 3:
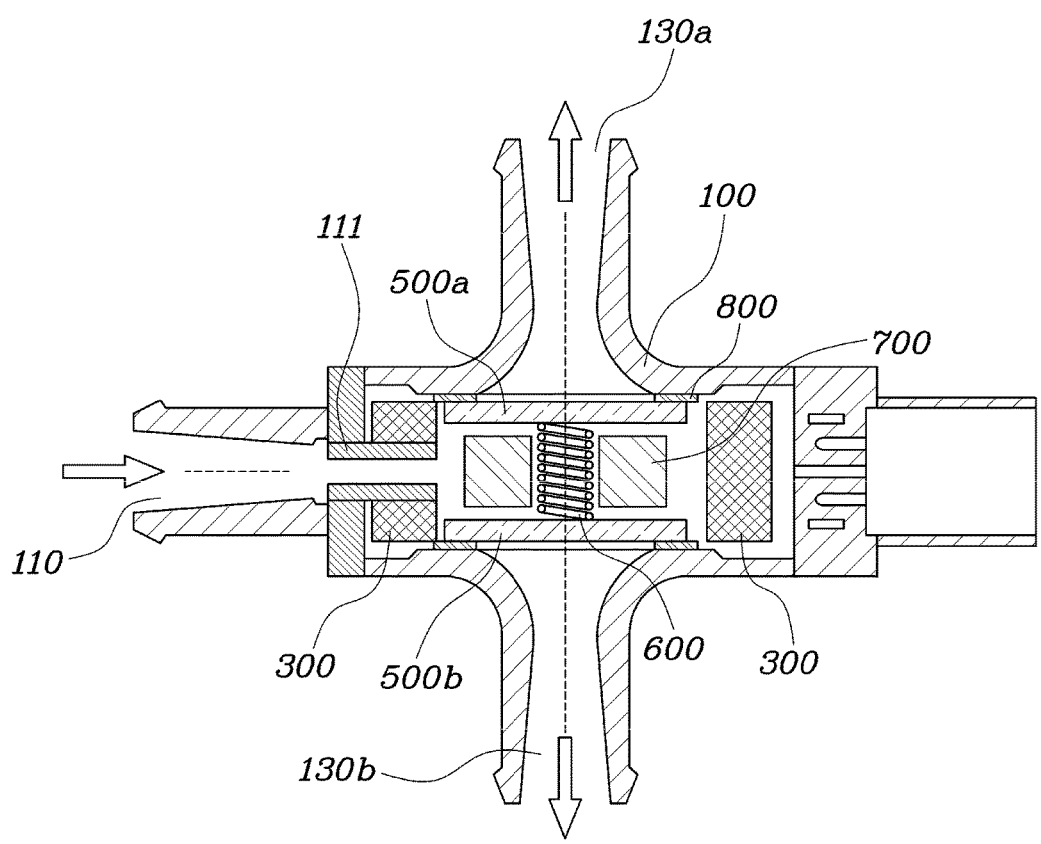
FIG. 3 is a view illustrating a solenoid valve according to an embodiment of the present disclosure.
Figure 4:
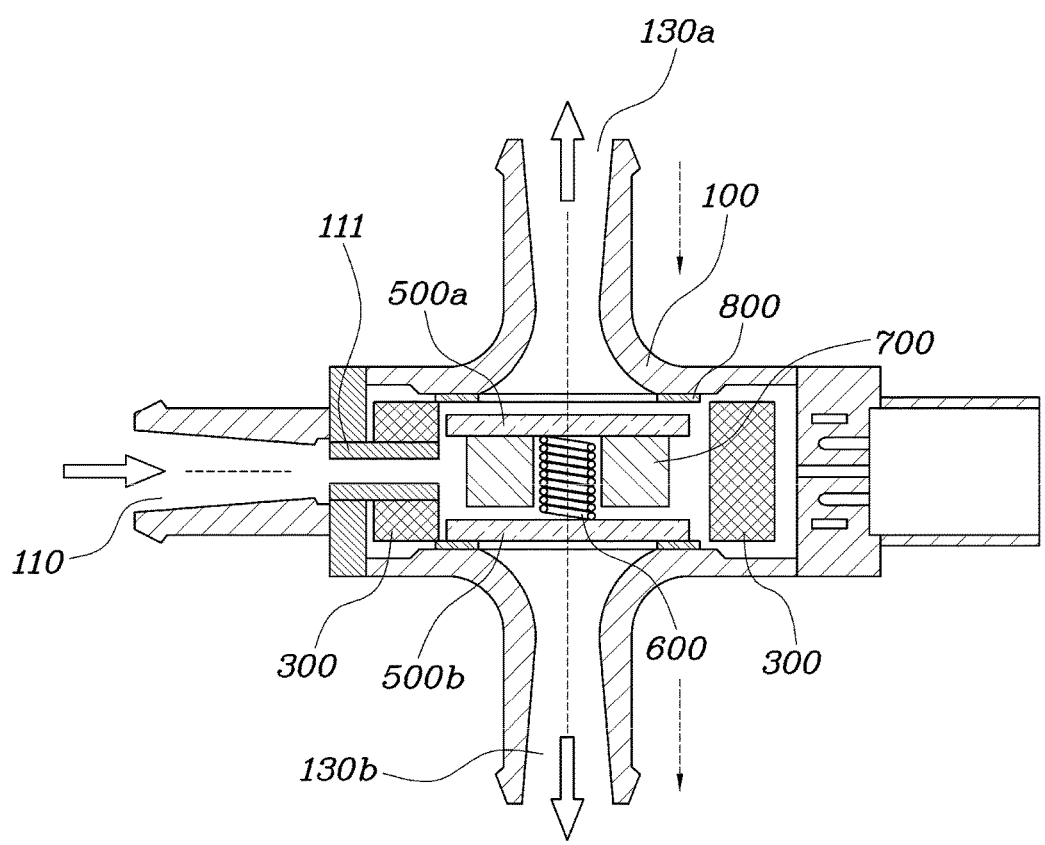
FIGS. 4 and 5 are views illustrating the operation state of the solenoid valve in FIG. 3.
Figure 5:
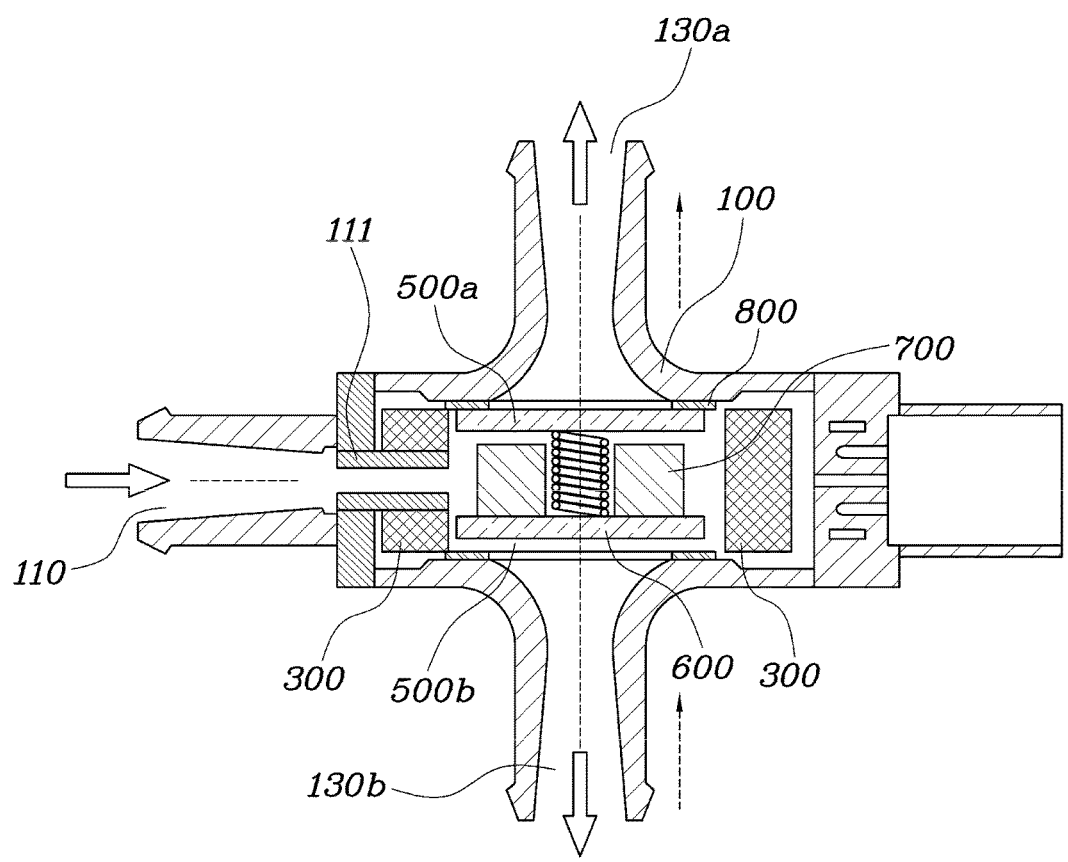

FIG. 3 is a view illustrating a solenoid valve according to an embodiment of the present disclosure. FIGS. 4 and 5 are views illustrating the operation state of the solenoid valve in FIG. 3.

The solenoid valve according to the embodiment of the present disclosure includes a valve body 100 having one inlet 110 through which a fluid is introduced, and a plurality of outlets 130 through which the introduced fluid is discharged, the inlet 110 and the outlets 130 extending from the valve body 100, and a variable switching means for discharging the fluid introduced from the inlet 110 through a selected one of the outlets 130 by a control unit (not shown).

The variable switching means is an armature 500 which is operated by a solenoid 300 to open or close each of the outlets 130. The armature 500 is arranged at a position corresponding to each of the outlets 130.

In more detail, the outlets 130 are formed at the respective upper and lower sides of the valve body 100, and the armature 500 is located inside the valve body 100 in each of the outlets 130, as illustrated in FIG. 3. In one form, the armature 500 is operated upward or downward by the operation of the solenoid 300 so as to open and close the associated outlet 130.

In particular, one of the outlets 130 is connected to an intake manifold of an engine, and the other is connected to the rear end of an air cleaner. The control unit controls the armature 500 in the outlet 130, which is connected to the intake manifold or the rear end of the air cleaner, such that the armature 500 is operated depending on the pressure condition of the intake manifold. Thereby, a conventional problem in which a purge is performed on only the intake manifold and is not normally performed as a whole due to a high pressure in the intake manifold is basically resolved.

An elastic member 600, which elastically supports the operation of the armatures 500 when the armatures 500 are opened and closed, is provided between the armatures 500, i.e. the armature 500a and the armature 500b. Support members 700, which support the armatures 500 when the armatures 500 are opened and closed, are provided at the sides of the elastic member 600, i.e. between the armature 500a and the armature 500b. The operation of the armatures 500 are guided by the elastic member 600 and the support members 700. Each of the support members 700 is a type of stopper. The support members 700 guide the armatures 500 such that the armatures 500 are not moved over a predetermined distance when the armatures 500 are operated to open the outlets 130.

In addition, a shock absorbing member 800, which is made of a material such as rubber, is provided between the valve body 100 and each of the armatures 500. Thereby, the shock absorbing member 800 may reduce noise and damage caused due to direct contact between the metallic armature 500 and the metallic valve body 100 and at the same time may prevent a fluid from leaking to the outside by a sealing function thereof.

The inlet 110 is formed with a guide portion 111 which extends into the valve body 100, and thus the fluid introduced from the inlet 110 is guided so as to be more smoothly introduced into the valve body 100. Therefore, the solenoid 300 may be divided by the guide portion 111 at the position of the guide portion 111.

Figure 6:
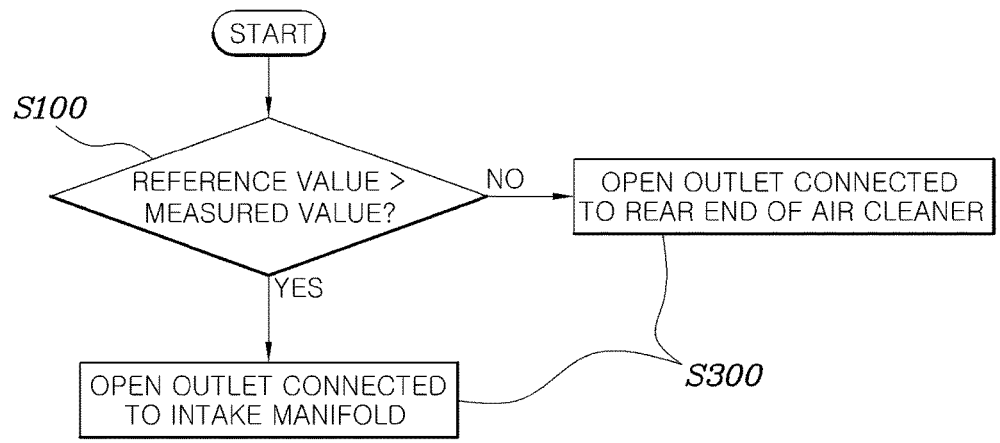
FIG. 6 is a flowchart illustrating a method of controlling the solenoid valve in FIG. 3.

FIG. 6 is a flowchart illustrating a method of controlling the solenoid valve in FIG. 3. The method of controlling the above-mentioned solenoid valve includes a comparison step S100 of comparing a reference value, which is previously input to the control unit, with a measured pressure value of the intake manifold, and an outlet opening step S300 of opening the outlets 130 by operating the armatures 500, corresponding to the respective outlets 130, according to result values derived from the comparison step S100.

When the pressure in the intake manifold is less than the reference value in the comparison step S100, a result value is derived for the operation of the armature 500a in the outlet 130a connected to the intake manifold. Thus, in the outlet opening step S300, the armature 500a in the outlet 130a connected to the intake manifold is operated according to the result value derived from the comparison step S100 so as to open the outlet 130a, thereby controlling a fluid in a canister such that the fluid is discharged to the intake manifold.

In contrast, when the pressure in the intake manifold is greater than the reference value in the comparison step S100, a result value is derived for the operation of the armature 500b in the outlet 130b connected to the rear end of the air cleaner. Thus, in the outlet opening step S300, the armature 500b in the outlet 130b connected to the rear end of the air cleaner is operated according to the result value derived from the comparison step S100 so as to open the outlet 130b, thereby controlling the fluid in the canister such that the fluid is discharged to the rear end of the air cleaner.

The operation of the armatures 500 will be described in more detail with reference to FIGS. 4 and 5. FIG. 4 illustrates a region in which the turbo is not operated, namely the operation when the pressure in the intake manifold is less than the reference value (the negative pressure state of the intake manifold). When the armature 500a is operated and the outlet 130a is opened, the fluid in the canister is transmitted to the intake manifold so as to be purged by the control unit. Accordingly, the control unit applies a current in the direction in which the armature 500a is opened, i.e. in the downward direction indicated by the arrow in the drawing. Therefore, the armature 500a, which closes the outlet 130a at the intake manifold, is opened by electromagnetic force, and the outlet 130b at the air cleaner is pressed and maintained in the direction in which the outlet 130b is more securely closed by electromagnetic force.

FIG. 5 illustrates a region in which the turbo is operated, namely the operation when the pressure in the intake manifold is greater than the reference value (the positive pressure state of the intake manifold). When the armature 500b is operated and the outlet 130b is opened, the fluid in the canister is transmitted to the rear end of the air cleaner so as to be purged by the control unit. Accordingly, the control unit applies a current in the direction in which the armature 500b is opened, i.e. in the upward direction indicated by the arrow in the drawing. Therefore, the armature 500b, which closes the outlet 130b at the rear end of the air cleaner, is opened by electromagnetic force, and the outlet 130a at the intake manifold is pressed and maintained in the direction in which the outlet 130a is more securely closed by electromagnetic force.

In accordance with the solenoid valve and the method of controlling the same, the control unit controls the application direction of the current according to the operation condition of the engine so as to generate electromagnetic force in a required direction, thereby enabling the flow of the evaporation gas to be controlled according to the proper condition. Thus, unlike the conventional solenoid valve, a separate check valve for prevention of backflow is unnecessary since the fluids supplied to the intake manifold and the purge line at the air cleaner are controlled by the respective outlets. Therefore, the check valve can be removed.

When the solenoid valve of the present disclosure is applied, a dual purge system for a vehicle equipped with a turbo-GDI engine can have a simple structure, and it is possible to achieve a reduction in cost through the removal of the check valve, an improvement in quality, and an advantageous layout design. In particular, since the check valve is removed, problems such as the blockage and fixation of the check valve can be basically avoided.

In accordance with a solenoid valve according to exemplary embodiments of the present disclosure, a control unit controls the application direction of a current according to the operation condition of an engine so as to generate electromagnetic force in a required direction, thereby enabling the flow of evaporation gas to be controlled according to the proper condition. Thus, unlike the conventional solenoid valve, a separate check valve for prevention of backflow is unnecessary since fluids supplied to an intake manifold and a purge line at an air cleaner are controlled by respective outlets. Therefore, the check valve can be removed.

Consequently, when the solenoid valve of the present disclosure is applied, a dual purge system for a vehicle equipped with a turbo-GDI engine can have a simple structure, and it is possible to achieve a reduction in cost through the removal of the check valve, an improvement in quality, and an advantageous layout design. Especially, since the check valve is removed, problems such as the blockage and fixation of the check valve can be basically prevented.

While the present disclosure has been described with respect to the specific embodiments, it will be apparent to those skilled in the art that various changes and modifications may be made without departing from the spirit and scope of the present disclosure as defined in the following claims.

What is claimed is:

1. A solenoid valve comprising:
a valve body comprising an inlet through which a fluid is introduced, and a plurality of outlets through which the introduced fluid is discharged; and
at least one armature comprising a first armature and a second armature configured to discharge the fluid introduced from the inlet through at least one of the outlets selected by a control unit, wherein said at least one armature operated by a solenoid configured to open or close each of the outlets,
wherein a plurality of support members are configured to support said at least one armature when said at least one armature is opened and closed, and at least one support member of the plurality of support members is provided between the first armature and the second armature,
wherein the plurality of support members guide the armatures such that the armatures are not moved over a predetermined distance when the armatures are operated to open the outlets,
wherein the support members are stoppers configured to remain stationary with respect to the valve body when said at least one armature moves between the open and closed positions, and
wherein an elastic member is configured to elastically support operation of said at least one armature when said at least one armature is opened and closed, and the elastic member is provided between the first armature and the second armature and disposed outside of the armatures.

2. The solenoid valve according to claim 1, wherein at least one support member of the plurality of support members is provided on sides of the elastic member and configured to support said at least one armature.

3. The solenoid valve according to claim 1, wherein a shock absorbing member is provided between the valve body and said at least one armature.

4. The solenoid valve according to claim 1, wherein the outlets are formed on upper and lower sides of the valve body, respectively, and said at least one armature is located inside the valve body in each of the outlets, and wherein said at least one armature is operated upward or downward by the operation of the solenoid so as to open and close the corresponding outlet.

5. The solenoid valve according to claim 1, wherein the inlet is formed with a guide portion extending into the valve body, and the solenoid is divided by and located in the guide portion.

6. The solenoid valve according to claim 1, wherein one of the outlets is connected to an intake manifold of an engine, and another outlet is connected to a rear end of an air cleaner.

* * * * *